April 28, 1936.  C. H. PALMER  2,039,184

REVERSIBLE MOTOR

Filed July 31, 1934   2 Sheets-Sheet 1

Inventor
Charles H. Palmer

By Geo. P. Kimmel
Attorney

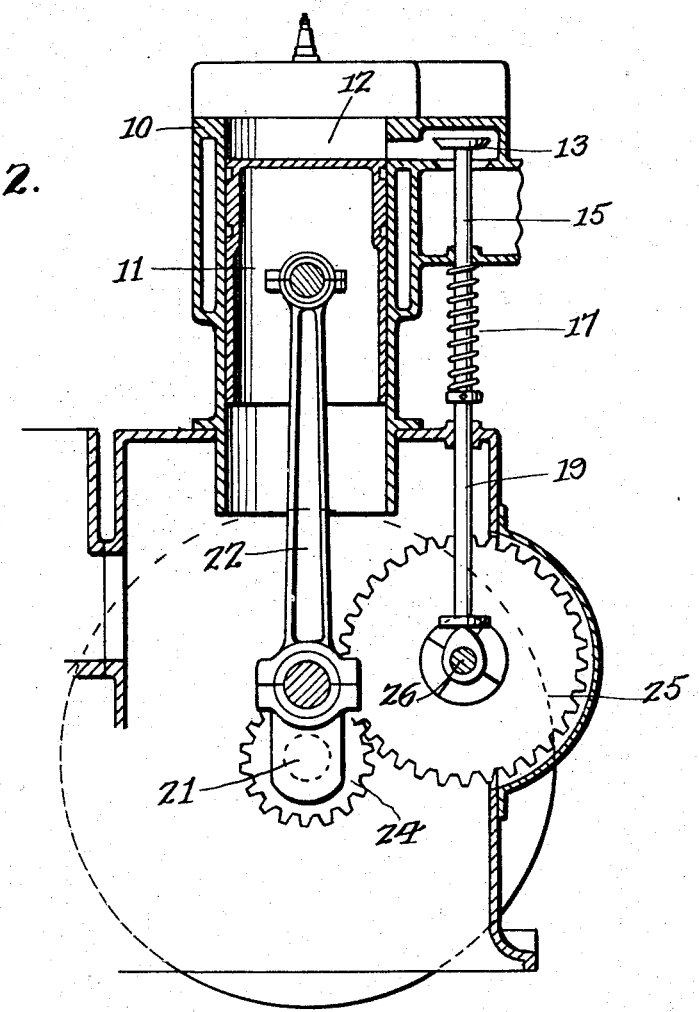
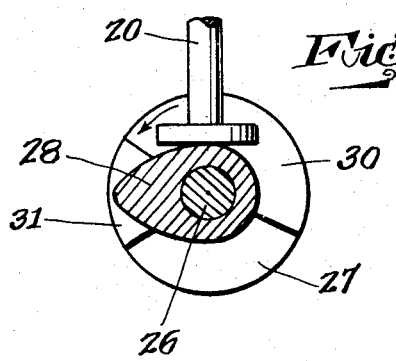
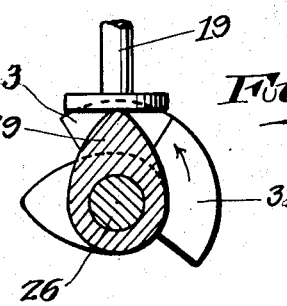

Patented Apr. 28, 1936

2,039,184

UNITED STATES PATENT OFFICE 2,039,184

REVERSIBLE MOTOR

Charles H. Palmer, Urbanna, Va.

Application July 31, 1934, Serial No. 737,823

6 Claims. (Cl. 123—41)

My present invention relates generally to marine motors, and more particularly to marine motors of the four cycle type whose substanding advantages in flexibility and economy in operation are somewhat opposed at present by the disadvantage with respect to ready reversal, since clutches and reversing gear arrangements are precluded except in motors of considerable cost.

My primary object is the provision of a reversible four cycle marine motor of small cost, such as the one or two cylinder motors used in small boats, which will function merely by manual rotation of the crank shaft in the desired direction.

A further object is the provision of an arrangement which is readily expansible by mere duplication of parts in adaptation of my invention to multiple cylinders of any desired number.

A still further object is the provision of an arrangement whereby the same firing action with respect to valve actuation may be maintained irrespective of the direction of rotation of the crank shaft.

Figure 1:
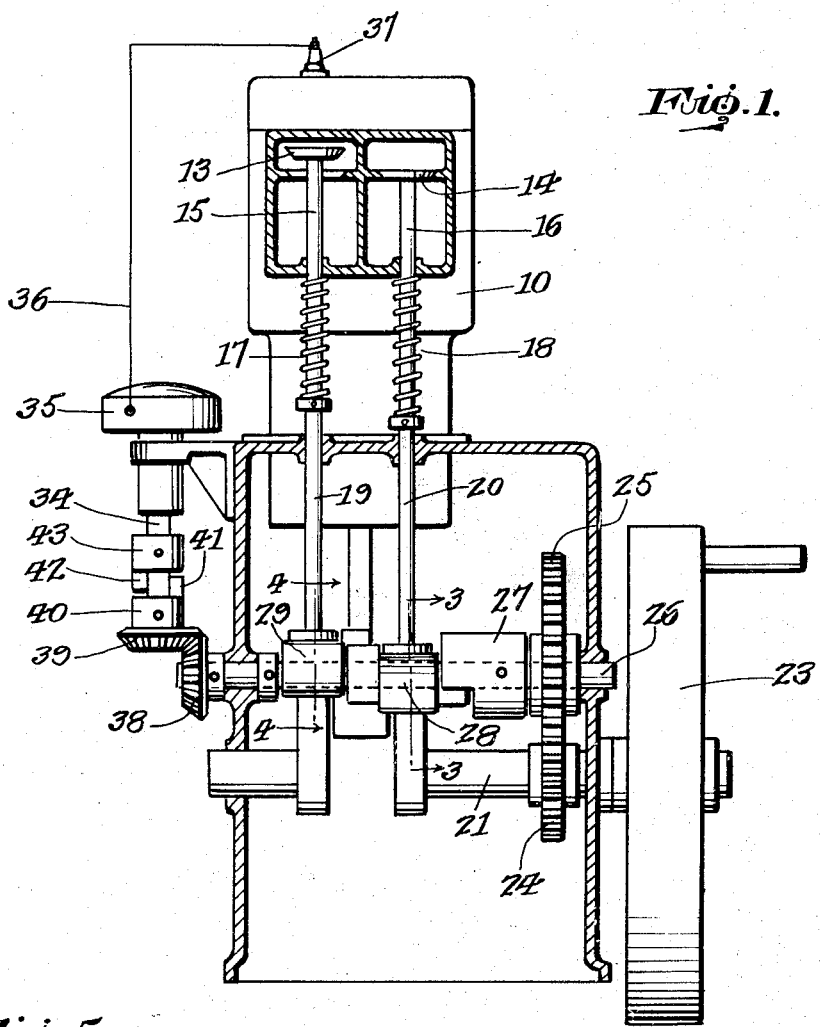

Still further objects as well as the various features of construction, arrangement and operation of my invention, and the resulting advantages thereof, may be better understood and more thoroughly appreciated, from the following detailed description thereof, and by reference to the accompanying drawings forming a part of this specification, and in which, Figure 1 is a sectional side view of an engine embodying my improvements.

Figure 2 is a transverse vertical section taken therethrough substantially on line 2—2 of Figure 1.

Figure 5:
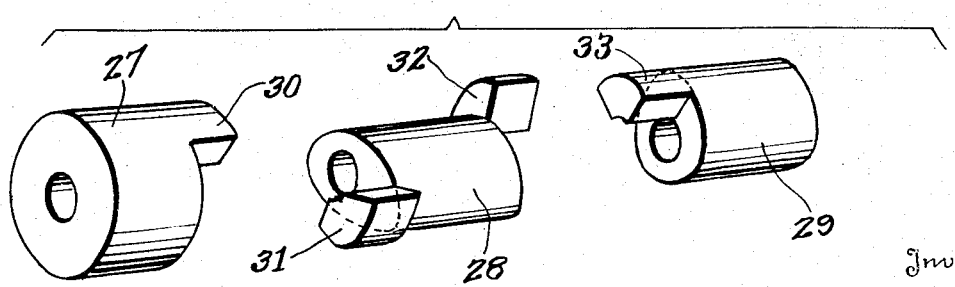

Figures 3 and 4 are vertical transverse detail sections through the two valve actuating cams, respectively as seen substantially on lines 3—3 and 4—4 of Figure 1, and Figure 5 is an exploded view in perspective of the cam actuating member and the valve actuating cams.

Referring now to these figures, I have shown in Figures 1 and 2 a representative small marine four cycle engine in which the single cylinder 10 houses the vertically sliding piston 11 and provides a combustion space 12, inlet to, and exhaust from, which are under control of valves 13 and 14. These valves are shown with depending rods 15 and 16 controlled by springs 17 and 18 and actuated through tappets 19 and 20 in a manner peculiar to my invention as presently seen.

The piston 11 actuates a lower crank shaft 21, through a connecting rod 22, and at one end this shaft 21 has a heavy starting and fly wheel 23 common to this type of motor.

The crank shaft drives, through gears 24 and 25, the cam shaft 26 on which is secured a cam actuating member 27 in the nature of a fixed collar, and upon which are loosely mounted a pair of cams 28 and 29 respectively below and permanently engaged by the tappets 20 and 19. The cams 28 and 29 are substantially of ovoid contour. The cams are loosely mounted at their larger ends upon shaft 26 whereby they are eccentrically disposed with respect to the latter. The cams are capable of being shifted in either direction on shaft 26.

The member 27 is of annular form and disposed concentrically with respect to shaft 21. Extending from the inner end of member 27 is a driving dog 30 of sector-like form having its outer face flush with the outer periphery member 27. The cam 28 has extended from its ends the coupling dogs 31, 32 of sector-like form. The dog 31 is arranged at the narrow portion of one end and the dog 32 at the wider portion of the other end of cam 28. The dogs 31, 32 are offset with respect to the outer periphery of cam 28. The cam 29 has extended from the inner end thereof a coupling dog 33 of sector-like form. The dog 33 is arranged at the narrow portion of the inner end and has its outer face flush with the outer periphery of cam 29.

The dog 30 is for selective engagement with the side edges of dog 31 for the purpose of operating the cam 28 in either direction from shaft 26. The dog 32 is for selective engagement with the side edges of cam 33 for the purpose of operating the latter in unison with cam 28. The side edges of the dogs are so set to contact at the same angles in both directions of rotation, so that although there is, in reversal of rotation of these parts, a certain interval of lost motion, the valve tappets 19 and 20 will be subjected to the full thrusts of the cams 28 and 29, and the valves 13 and 14 actuated thereby in the same timed relation irrespective of the direction of rotation of the parts. The construction and arrangement of the member 27 and cams 28, 29 provides for the flexibility of cam adjustment and an action which permits of the timing of the opening of the inlet valve a little later and still closes it at the proper time whereby there is created a greater vacuum in the cylinder, which in turn creates greater turbulence in incoming fuel, making the latter more combustible whereby the efficiency of the engine is increased. Then further, as the tappets are in permanent engagement with the cams it prevents the tappets from hanging on any part of a cam at any time or position whereby proper change of position will be had at all times.

In furtherance of the above, a compensating timing mechanism is provided, wherein the timer shaft 34, at whose upper end a distributor 35 operates through a high tension wire 36 to create a spark at the plug 37 for firing the charge, is connected at its lower end through bevel gears 38 and 39 with the cam shaft 26.

Bevel gear 38 is, of course, fixed to cam shaft 26, but bevel gear 39 is loose on the timer shaft 34 and in connection with a collar 40 having a driving projection or dog 41 extending endwise therefrom to engage the similar projection or dog 42 of a collar 43 fixed to the timer shaft. Thus the oppositely contacting faces of these dogs 41 and 42, being properly spaced and angled will provide a lag in the reversal of rotation of the parts compensating for the interval of lost motion in the reversal of the valve actuating cams so as to bring the spark in properly timed relation to the timed valve actuation in both directions of rotation of the parts. The drive for the timer mechanism compensates for a complete revolution of the crank shaft of the engine, and as it is independent of the valve cam mechanism and of adequate strength and positiveness of action it is suitable to drive and time, either an electric spark device for gasoline engines or a fuel injection pump for Diesel engines in both clockwise and counterclockwise direction of rotation.

It is obvious from the foregoing that with my improvements it is not necessary to regulate any adjustable parts in operation or in fact to do anything except rotate the fly wheel 23 in a direction corresponding to that in which it is desired to proceed, rendering the present reversible motor especially desirable to those operators lacking the mechanical knowledge to properly actuate and set adjustable parts.

Moreover my improvements may be added to a small engine in manufacture, with but little, if any, extra expense, and while especially important in connection with small motors, has an important advantage in larger motors since a mere duplication of its parts is involved for each additional cylinder.

As a final advantage, it may be mentioned that my invention contemplates and includes positive actuation of the intake as well as the exhaust valve of each cylinder as distinguished from those adjusting arrangements, now known, which actuate the exhaust valve only, leaving the intake valve to open under suction at all times.

What I claim is:

1. In a reversible four-cycle engine having intake and exhaust valves and a crank shaft rotatable in opposite directions for starting the engine, valve actuating means driven by, and reversible with, the crank shaft including a rotatable element driven from the crank shaft and a pair of loosely mounted rotatable intake and exhaust valves actuating cams having relative circumferential movement, and means extended from said element and cams engageable during such movement and presenting oppositely contacting faces arranged to provide for said cams to actuate the valves in similarly timed relation, irrespective of the direction of the rotation of the crank shaft.

2. In a reversible four-cycle engine having intake and exhaust valves and a crank shaft manually rotated in opposite directions, a cam shaft actuated by said crank shaft, a cam driving member fixed to said cam shaft, and intake and exhaust valves actuating cams loose on the cam shaft and circumferentially shiftable with respect to one another and said driving member, said cams and said driving member having lengthwise extending portions abutting with one another during such shifting movements, the contact faces of which portion are circumferentially disposed to bring about the actuation of the intake and exhaust valves in similarly timed relation upon rotation of the crank shaft in either direction.

3. In a reversible four-cycle engine including intake and exhaust valves having tappets and a crank shaft, a valve actuating mechanism including cams for actuating each of said valves, said cams permanently in engagement with said tappets, and a cam driving member actuated by said crank shaft, said cams and cam driving member having limited relative circumferential movement and having end projecting portions engaging one another during such movement and presenting oppositely contacting faces angled and disposed to bring the cams into similar actuating relation to the valves in both directions of rotation.

4. In a reversible motor, cams, freely mounted upon a shaft, driven by a gear through a lost motion connection and driving each other through a similar lost motion connection.

5. In a reversible motor, a reversible shaft, a pair of cams freely mounted on the shaft, a gear fixed to the shaft, said cams being driven from said gear by a lost motion connection, and said cams driving each other through a similar lost motion connection.

6. In a reversible four-cycle engine having intake and exhaust valves, tappets and a crank shaft, in combination, a pair of cams, each permanently in engagement with a tappet, a rotatable cam shaft, said cams being freely mounted upon and capable of being bodily rotated with said cam shaft, one of said cams being provided at each end with a projection, the other of said cams being provided with a projection coacting with one of the projections of said pair for driving said cams in unison, a driving member fixed to said cam shaft, said member being formed with a projection coacting with the other projection of said pair upon the rotation of said member in opposite directions whereby said cams will be bodily driven with said cam shaft, the said projections providing a lost motion connection between the cams and between said member and one of the cams.

CHARLES H. PALMER.